(12) United States Patent
Bayard et al.

(10) Patent No.: US 10,988,117 B2
(45) Date of Patent: Apr. 27, 2021

(54) DEVICE FOR HEATING A SYSTEM FOR DISTRIBUTING WINDSCREEN-WASHER LIQUID OF A MOTOR VEHICLE, HYDRAULIC COUPLING INCLUDING SUCH A DEVICE AND ASSOCIATED ASSEMBLY METHOD

(71) Applicant: Valeo Systèmes d'Essuyage, Le Mesnil Saint Denis (FR)

(72) Inventors: Geoffrey Bayard, Issoire (FR); Nadia Berthon, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 378 days.

(21) Appl. No.: 15/748,074

(22) PCT Filed: Jul. 29, 2016

(86) PCT No.: PCT/EP2016/068133
§ 371 (c)(1),
(2) Date: Jan. 26, 2018

(87) PCT Pub. No.: WO2017/017247
PCT Pub. Date: Feb. 2, 2017

(65) Prior Publication Data
US 2018/0215351 A1   Aug. 2, 2018

(30) Foreign Application Priority Data

Jul. 29, 2015  (FR) ........................................ 1557238

(51) Int. Cl.
*B60S 1/48*      (2006.01)
*H05B 1/02*      (2006.01)
(Continued)

(52) U.S. Cl.
CPC ............... *B60S 1/488* (2013.01); *B60S 1/524* (2013.01); *H05B 1/0213* (2013.01);
(Continued)

(58) Field of Classification Search
CPC ........ B60S 1/488; B60S 1/524; B60S 1/0236; H05B 1/0213; H05B 3/56; H05B 3/48;
(Continued)

(56) References Cited

U.S. PATENT DOCUMENTS 1,474,723 A * 11/1923 Levinson ................. H05B 3/48
                                                          338/240
1,731,119 A * 10/1929 Abbott ..................... H05B 3/48
                                                          219/539

(Continued)

FOREIGN PATENT DOCUMENTS

EP      2777996 A1    9/2014
FR      2 965 234 A1  3/2012
(Continued)

OTHER PUBLICATIONS

International Search Report of the International Searching Authority issued in PCT/EP2016/068133 dated Oct. 19, 2016 (4 pages).
(Continued)

*Primary Examiner* — Donnell A Long
(74) *Attorney, Agent, or Firm* — Osha Bergman Watanabe & Burton LLP

(57) ABSTRACT

A heating device for a system for distributing windshield washer fluid of a motor vehicle. The heating device may include a sleeve comprising two flow channels for distributing the windshield washer fluid, the two flow channels being parallel to one another. The heating device may include at least two heating conductors embedded in a mass of the sleeve. The heating device may include a current regulator controlling the current flowing in the heating
(Continued)

conductors as a function of a temperature of said heating conductors.

12 Claims, 4 Drawing Sheets

(51) Int. Cl.
    *H05B 3/56*           (2006.01)
    *H05B 3/48*           (2006.01)
    *B60S 1/52*           (2006.01)

(52) U.S. Cl.
    CPC ............ *H05B 1/0236* (2013.01); *H05B 3/48* (2013.01); *H05B 3/56* (2013.01); *H05B 2203/02* (2013.01); *H05B 2203/021* (2013.01)

(58) Field of Classification Search
    CPC ............ H05B 1/0236; H05B 2203/021; H05B 2203/02
    See application file for complete search history.

(56) References Cited

U.S. PATENT DOCUMENTS

| | | | | |
|---|---|---|---|---|
| 1,731,120 | A * | 10/1929 | Abbott | H05B 3/50 219/544 |
| 3,341,690 | A * | 9/1967 | Commins | H05B 3/56 219/528 |
| 5,791,377 | A * | 8/1998 | LaRochelle | B60S 1/488 138/109 |
| 10,384,653 | B2 * | 8/2019 | Shank | B60S 1/50 |
| 2003/0052121 | A1 * | 3/2003 | Sopory | H05B 3/0009 219/505 |
| 2006/0124761 | A1 * | 6/2006 | Shank | B60S 1/482 239/13 |
| 2008/0053981 | A1 * | 3/2008 | Adachi | H05B 3/50 219/202 |
| 2009/0283605 | A1 * | 11/2009 | Arkashevski | B60S 1/50 239/13 |
| 2011/0056986 | A1 * | 3/2011 | Shank | B60S 1/488 222/146.2 |
| 2012/0146209 | A1 * | 6/2012 | Hu | H01L 23/36 257/692 |
| 2012/0217233 | A1 * | 8/2012 | Base | H05B 3/44 219/534 |
| 2013/0219647 | A1 * | 8/2013 | Calluiere | B60S 1/488 15/250.01 |
| 2013/0292105 | A1 * | 11/2013 | Salamon | H01L 23/3672 165/185 |
| 2014/0124499 | A1 * | 5/2014 | Wei | H05B 3/24 219/541 |
| 2015/0166019 | A1 * | 6/2015 | Caillot | H05B 3/48 15/250.04 |
| 2015/0230289 | A1 * | 8/2015 | Corona | H05B 3/0294 219/494 |
| 2015/0375718 | A1 * | 12/2015 | Jarasson | B60S 1/524 219/202 |
| 2019/0060583 | A1 * | 2/2019 | Avuthu | A61J 1/10 |
| 2019/0141788 | A1 * | 5/2019 | Kazemi | H05B 1/0291 |

FOREIGN PATENT DOCUMENTS

| | | |
|---|---|---|
| FR | 2965235 A1 | 3/2012 |
| WO | 2009/014589 A1 | 1/2009 |
| WO | 2010/025957 A1 | 3/2010 |
| WO | 2014/095945 A1 | 6/2014 |

OTHER PUBLICATIONS

Written Opinion of the International Searching Authority issued in PCT/EP2016/068133 dated Oct. 19, 2016 (8 pages).

* cited by examiner

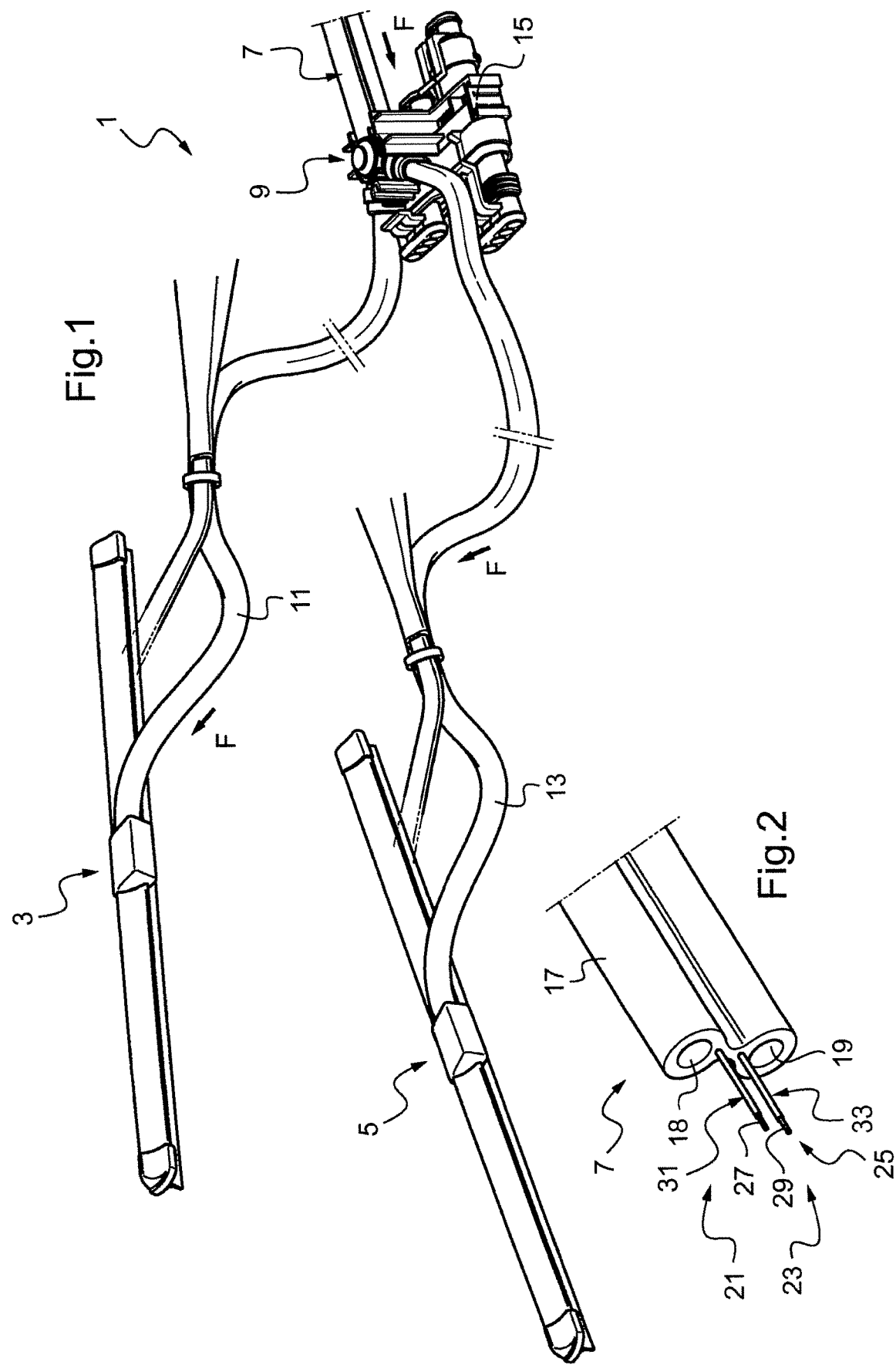

DEVICE FOR HEATING A SYSTEM FOR DISTRIBUTING WINDSCREEN-WASHER LIQUID OF A MOTOR VEHICLE, HYDRAULIC COUPLING INCLUDING SUCH A DEVICE AND ASSOCIATED ASSEMBLY METHOD

CROSS-REFERENCE TO RELATED APPLICATIONS

Application PCT/EP2016/068133 claims priority from Application 1557238 filed on Jul. 29, 2015 in France. The entire contents of these applications are incorporated herein by reference in their entirety.

BACKGROUND

Motor vehicles are commonly equipped with a glass surface wiping system which may be used to provide a driver with a clear view of the environment thereof, in particular in the event of bad weather. Such a system generally comprises one or two windshield wiper blades which scrape the outer surface of the glass surface so as to clear water and/or snow present on this surface out of the field of vision of the driver.

SUMMARY

The present invention relates to a heating device for a system for distributing windshield washer fluid of a motor vehicle in which the windshield washer fluid is heated up/thawed before being projected. In a nonlimiting manner, the windshield washer fluid is, for example, projected onto a glass surface of the motor vehicle. The invention applies more particularly to the control of the temperature of heating conductors of the heating device.

The present invention also relates to a hydraulic coupling including such a heating device. Motor vehicles are commonly equipped with a glass surface wiping system used to provide the driver with a clear view of the environment thereof, in particular in the event of bad weather. Such a system generally comprises one or two windshield wiper blades which scrape the outer surface of the glass surface so as to clear the water and/or the snow present on this surface out of the field of vision of the driver.

It is also known to equip vehicles with a washing system arranged to project a washing fluid onto a glass surface, so as to help dissolve dirt, and thus increase the quality of the cleaning of this windshield in particular under the action of the wiping system. In one washing system version, the washing system includes jet nozzles located on the vehicle. In another version, each windshield wiper blade includes, for example, a spray line provided with one or a multitude of jet nozzles or holes for spraying under pressure, allowing the windshield washer fluid to be distributed onto the glass surface.

The invention relates more generally to any washing system arranged to be mounted on a vehicle and project a washing fluid onto a surface of said vehicle.

The jet nozzles are supplied with windshield washer fluid contained in a reservoir via a pump.

The jet nozzles can be located on one or more spray lines of windshield wiper blades or on a support fixed to the structure of the vehicle near the surface to be cleaned.

When the temperature of the windshield washer fluid is too low, for example, below 5° C., the windshield washer fluid is heated up/thawed. For this purpose, a feed pipe heats up the windshield washer fluid taken from the reservoir by the pump toward the jet nozzle(s), for example, at the time when the command for the windshield washer is actuated. In the example of a windshield wiper system, the implementation is generally by means of the command lever positioned beside the steering wheel and controlling, among other things, the actuation of the windshield wipers.

For actually heating up the windshield washer fluid, a network of heat-up and feed pipes is used, each heat-up pipe including a sleeve, in particular extruded, of flow channels and in which heating conductors are embedded in the mass. The heating conductors heat the heat-up and feed pipes which in turn heat up the windshield washer fluid.

The heating conductors can be used over wide ranges of ambient temperatures, for example, from −40° C., when the vehicle is stationary in freezing cold, to +130° C., when the vehicle is moving and the external temperature of the vehicle is +5° C.

To assess the temperature of the heating conductors, a heating temperature due to the heating of the heating conductors in operation at ambient temperature is taken into account. At present, the heating conductors emit the same heat regardless of the external temperature. When the ambient temperature is high, the temperature of the heating conductors in operation is also high. If the temperature of the heating conductors exceeds a tolerance threshold associated with the material from which they are manufactured, then they risk melting and/or starting a fire.

One of the aims of the present invention is to overcome these disadvantages by proposing a heating device for a system for distributing windshield washer fluid of a motor vehicle. This improved heating device allows efficient and simple control of the temperature of the heating conductors, and also makes it possible to heat up the hydraulic coupling of the heating device.

The term "washing fluid" means, in the scope of the invention, any windshield washer-type fluid suitable for cleaning a vehicle glass surface, in particular the cleaning associated with the use of a windshield wiper blade.

To this end, the object of the present invention is a heating device for a system for distributing windshield washer fluid of a motor vehicle, said heating device comprising: at least two heating conductors, characterized in that it further comprises a current regulator controlling the current flowing in the heating conductors as a function of the temperature of said at least two heating conductors.

Such a device makes it possible to increase the robustness of the heating conductors 23, 25 with respect to the temperature, and also with respect to the supply current of the heating conductors.

According to one or more features of the heating device, taken alone or in combination: the current regulator is connected in series to the heating conductors so as to close a heating electric circuit; the current regulator comprises a switch capable of opening the heating electric circuit when the heating conductors reach a threshold temperature; the current regulator comprises a bimetal thermostat; the current regulator comprises a current stabilizer, the resistance of which increases with the temperature of the heating conductors; the current regulator comprises a positive temperature coefficient thermistor; the heating device includes a closed control loop in which the current regulator controls the temperature of the heating conductors as a function of a measured temperature of the heating conductors and of a threshold value; the current regulator is fixed in a hydraulic coupling of the system for distributing windshield washer fluid; and the current regulator is encapsulated in a thermal adhesive promoting the dissipation of the heat thereof.

According to another aspect, an object of the invention is a system for distributing windshield washer fluid of a motor vehicle, comprising a heating device as described above.

According to yet another aspect, an object of the invention is a hydraulic coupling of a system for distributing windshield washer fluid including passage grooves housing heating conductors and a current regulator placed in a housing of the hydraulic coupling and controlling the current flowing in the heating conductors as a function of the temperature of the two heating conductors, the heating conductors and the current regulator thus forming, at least in part, a heating device as described above.

The invention also relates to a method for assembling the heating device comprising a thermally conductive ring, characterized in that it comprises the following steps: the heating conductors are put into passage grooves of the hydraulic coupling, the current regulator is positioned in a housing of the hydraulic coupling, the thermal adhesive is poured into the housing so as to encapsulate the current regulator.

BRIEF DESCRIPTION OF DRAWINGS

Other features and advantages of the invention will emerge from the following description, given by way of example, without any limitation, with regard to the appended drawings, in which:

FIG. 1 is a schematic view of elements of a system for distributing windshield washer fluid of a motor vehicle, FIG. 2 is a cross-sectional view of a main heat-up pipe of the distribution system of FIG. 1 and of the elements of a heating device.

In these figures, the identical elements have the same reference numbers.

DETAILED DESCRIPTION

Figure 3:
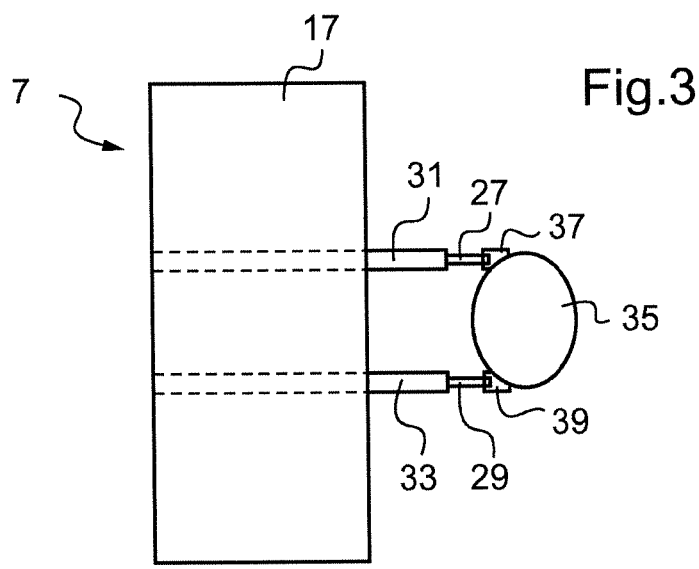
FIG. 3 is a schematic view of a current regulator assembled to the main heat-up pipe.

FIG. 1 is a general schematic view of the elements of a system for distributing windshield washer fluid 1 of a motor vehicle. The example set out in the above description is a system for windshield wiper blades 3, 5 having two spray lines. Of course, it is entirely possible to have only one spray line.

In the example, the windshield wiper blades 3, 5 having two lines have a spraying line on each side of the arm of the windshield wiper blade (not shown). The windshield washer fluid is sent only onto the front part of the blade, i.e. the windshield washer fluid is sent onto the spray line located on the side from which the arm of the windshield wiper blade advances during an upward stage of the sweeping and on the other side during the downward stage of the sweeping. This arrangement makes it possible to instantaneously wipe the windshield washer fluid after it has been deposited on the glass surface, thereby removing any interval during which vision could have been reduced.

The system for distributing windshield washer fluid 1 includes a main heat-up pipe 7 intended to be coupled to a windshield washer fluid pump of the motor vehicle (not shown), which is itself coupled to a reservoir (not shown), and a hydraulic coupling 9 for coupling the main heat-up pipe 7 to windshield wiper blade secondary heat-up pipes 11 and 13 coupled to the spraying lines, respectively, of the windshield wiper blades 3, 5 of the motor vehicle.

In another non-illustrated embodiment, the secondary heat-up pipes 11 and 13 are coupled to two jet nozzles or groups of jet nozzles, respectively, of the motor vehicle, which are fixed, directly or via a support, on the structure of the vehicle near the surface to be cleaned.

The main heat-up pipe 7 and the hydraulic coupling 9 are, for example, placed under the hood of the motor vehicle, i.e. in the engine compartment, while the secondary pipes 11, 13 are placed outside, in the example integrated in the windshield wiper blades 3, 5. The hydraulic coupling 9 is assembled to a housing 15 of the vehicle in order to be kept fixed in the vehicle.

The hydraulic coupling 9 can, for example, comprise check valves. The check valves allow the passage of the pumped fluid in the direction of flow from the pump toward the jet nozzle or nozzles, toward the line in the illustrated example (see the arrows F in FIG. 1) and the blocking of the return of the pumped fluid stream in the other direction, i.e. from the jet nozzle or nozzles, which, in the example, are located on the blades, toward the pump.

The secondary heat-up pipes 11, 13 are, in particular, similar to the main heat-up pipe 7. They each include a sleeve, preferably extruded, of a flow channel and two heating conductors embedded in the mass of the sleeve (not shown).

The heating power is determined by the diameter of the flow channels.

As can be seen in the sectional view of the main heat-up pipe 7 in FIG. 2, said pipe includes an extruded sleeve 17 of two flow channels 18, 19. Furthermore, a heating device 21 is positioned partially in the sleeve 17. The heating device 21 comprises two heating conductors 23, 25 embedded in the mass of the sleeve 17. In the exemplary embodiment shown in FIG. 2, the section of the sleeve 17 has a general shape of an eight and the heating conductors 23, 25 are aligned at the center between the flow channels 18, 19. The heating conductors 23, 25 and the flow channels 18, 19 are longitudinally substantially parallel to one another.

The sleeve 17 is preferably made of flexible material, for example, rubber. The flow channels 18, 19 for the windshield washer fluid and the heating conductors 23, 25 are, for example, obtained by extrusion and the heating conductors 23, 25 are inserted with the sleeve extruded material.

The heating conductors 23, 25 include, for example, one or more electrical conducting wires 27, 29 covered with an electrically insulating sheath 31, 33, for example, made of PVC plastic. The electrical conducting wires 27, 29 comprise, for example, one to several (four for example) strands of sub-millimetric dimensions (for example 150 μm in diameter). These strands comprise, for example, a resistive material, i.e. a material that releases heat when an electric current passes therethrough. This material comprises, for example, a copper-nickel CuNi or nichrome NiCr alloy. Under the effect of the electric current, the strands will heat up and transmit the heat thereof to the insulating sheath which, in turn, heats up the sleeve 17. The sleeve 17 in turn heats up the fluid flowing in the channels 18, 19, so that the windshield washer fluid taken from the reservoir by the pump(s) toward the respective spray line are heated up.

Outside the sleeve 17, the heating conductors 23, 25 are covered in order to prevent corrosion and short circuits. This covering (not shown) is made of heat-shrinkable material containing a sealing polymer agent, or of resin.

The heating conductors 23, 25 are connected to a predefined voltage supply, for example, a battery, on the pump side.

During a thermal sizing step, parameters of the heating device are determined such as the linear resistance of the heating conductors 23, 25, and the supply voltage of the heating device 21, that will allow the desired heat amount to be released, i.e. the released power. By way of example, the released power is 55 W/m, the supply voltage is 13.5 V and the linear resistance is between 0.6/m and 5.2/m. Once the heating device 21 is assembled in the vehicle, these parameters can no longer be easily modified.

It is noted that the temperature of the sheaths and that of the electrical conductors are approximately equal, for example, to within 10° C. Subsequently, reference is made to a temperature of the heating conductors 23, 25. The operating heating conductors 23, 25 have a temperature T (see FIG. 5) equal to an ambient temperature, i.e. a temperature in the immediate vicinity, to which a heating temperature due to the heat that they release is added.

On the hydraulic coupling 9 side, the heating conductors 23, 25 are connected in series to a current regulator 35 (FIG. 3). To this end, the current regulator 35 has terminals 37, 39 to which the electrical conductors 27, 29 are welded or crimped. The current regulator 35 closes the electric circuit of the heating device. This avoids the use of additional electrical elements such as shunts.

A current regulator 35 makes it possible to control the temperature of the heating conductors 23, 25.

Figure 4:
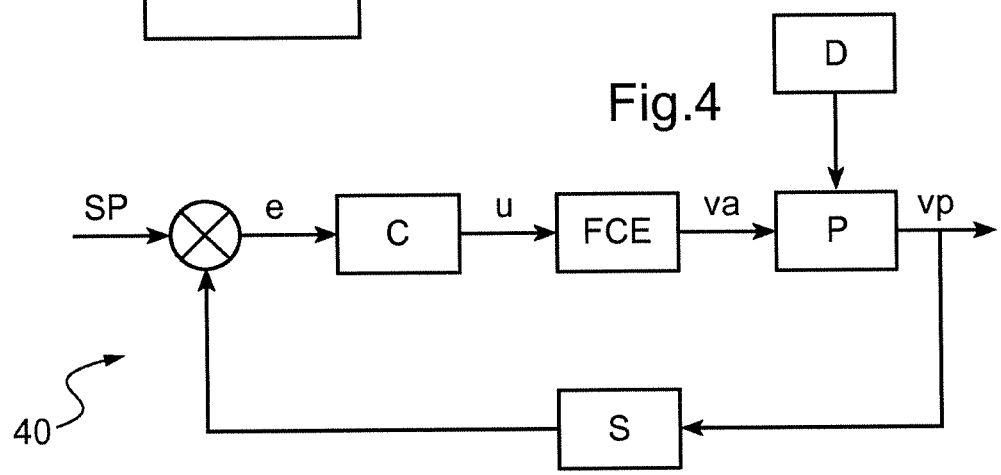
FIG. 4 shows a control loop for regulating a temperature of the heating conductors.
Figure 5:
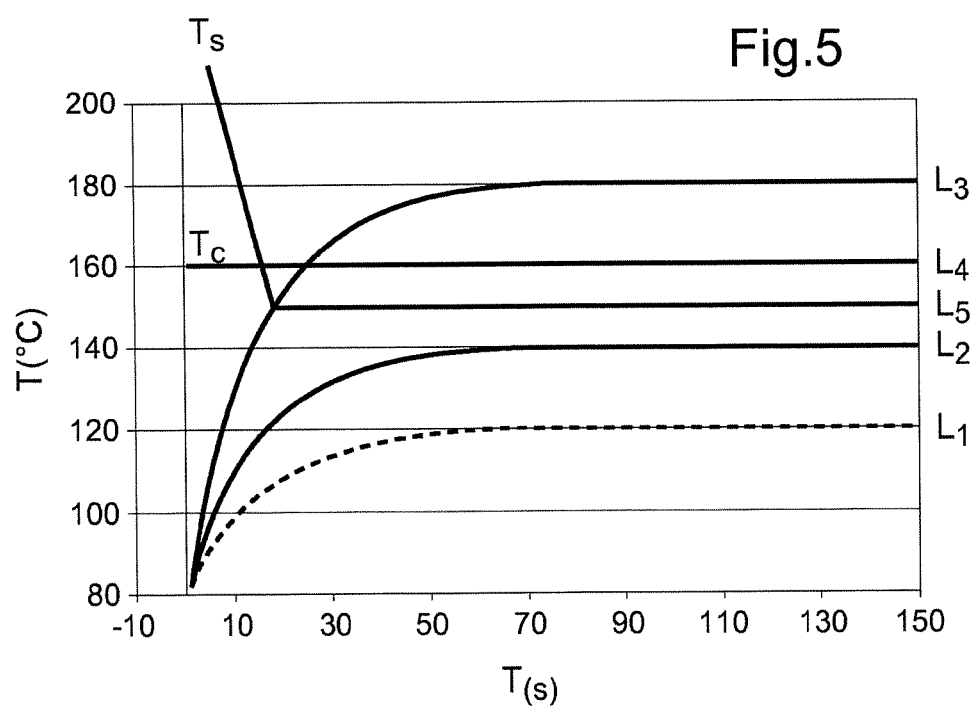
FIG. 5 is a graph depicting the temperature variation of heating conductors of the heating device at various supply voltages.

According to a first embodiment, the current regulator 35 comprises a bimetal thermostat calibrated to be activated at a threshold first predetermined temperature Ti (see FIG. 5). According to this first embodiment, the bimetal thermostat makes it possible to set up a closed control loop 40 for the temperature of the heating conductors 23, 25. FIG. 4 shows this control loop 40 in a schematic manner.

Generally, a closed control loop comprises a controller C, the aim of which is to keep a variable vp of a process P at a predetermined set point SP (meaning "Set Point"). The value of the variable of the process vp is measured by a sensor S, then compared with the set point SP. The difference between these two values is called an error e. Depending on this error, the controller C sends a command u to a final control element FCE which will change an adjustment variable va. This adjustment variable va is introduced into the process P. In addition, the process P is subject to disturbances D of the external environment. The new value of the variable of the process vp is measured by the sensor S and sent to the controller C.

In the temperature control loop 40, the controller C comprises the current regulator 35. The process P comprises the heating of the heating conductors 23, 25. The process variable comprises the temperature T of the heating conductors 23, 25.

The bimetal thermostat comprises, for example, two electrically conductive plates (not shown) having different coefficients of expansion. Thus, when the temperature of the heating conductors 23, 25 is lower than the threshold temperature $T_s$, the plates are in contact. The electric circuit is therefore closed, and the heating device 21 operates. When the temperature increases, the plates expand and deform differently, thus moving away from each other. Thus, when the heating conductors 23, 25 reach the threshold first temperature $T_{s1}$, the plates of the bimetal separate. The electric circuit is thus open, and the heating device 21 no longer operates. The bimetal thermostat acts as a switch of the electric circuit, making it possible to interrupt the flow of the current when the temperature of the heating conductors 23, 25 reaches the threshold first temperature $T_{s1}$.

In the control loop 40, the bimetal thermostat is used as a controller C and as a sensor S. The process variable vp comprises the temperature T of the heating conductors. This measured value is subtracted from the set point SP that comprises the threshold first temperature $T_{s1}$. If the difference, i.e. the error e, between these two values is greater than or equal to zero, then the heating conductors 23, 25 risk exceeding usage temperature limits of the materials forming the latter, or even reaching the melting point thereof. In this case, the command u of the bimetal thermostat comprises the opening of the electric circuit. The final control element FCE comprises, for example, the plates of the bimetal thermostat. The adjustment variable va comprises the value of the electric current, in this case this value is zero. The heating conductors 23, 25 are no longer powered and the temperature T thereof drops.

In this control loop 40, the disturbances D comprise the ambient temperature that varies depending on the temperature outside the vehicle and depending on whether the vehicle is stationary or moving.

FIG. 5 illustrates the temperature regulation of the heating conductors 23, 25 using a graph of variation of the temperature T (y-axis) of the heating conductors 23, 25 over time t (x-axis), for various supply voltages.

In FIG. 5, a first curve $L_1$ shows the variation in the temperature T of the heating conductors 23, 25 powered at a voltage of 11 V, a second curve $L_2$ shows that of heating conductors 23, 25 powered at a voltage of 13.5 V, and a third curve $L_3$ of heating conductors 23, 25 powered at a voltage of 15 V. In these first three arrangements, the heating device 21 does not comprise a bimetal thermostat-type current regulator 35.

FIG. 5 also depicts a fourth horizontal curve $L_4$ showing a critical temperature of use $T_c$ of the heating conductors 23, 25. Beyond this temperature, the heating conductors 23, 25 can be damaged. By way of example, this critical temperature $T_c$ is 160° C.

The first, second and third curves $L_1$, $L_2$, $L_3$, have the same profile: firstly, a rapid temperature rise is observed. This temperature rise corresponds to putting the heat device 21 into operation or starting the vehicle. Then the temperature stabilizes and approaches a constant value. The stabilized temperature of the curves is dependent upon the supply voltage of the heating conductors 23, 25. The higher the supply voltage, the higher the released power, and therefore the higher the stabilized temperature. According to this example, the supply voltages of 11 V, 13.5 V and 15 V result in stabilized temperatures of 120° C., 140° C. and 180° C., respectively. The curve $L_3$ therefore exceeds the critical temperature $T_c$ of the heating conductors 23, 25.

Finally, FIG. 5 depicts a fifth curve $L_5$ showing the variation in the temperature of heating conductors 23, 25 powered at a voltage of 15 V when the heating device 21 comprises a current regulator 35 of bimetal thermostat type. By way of example, a maximum temperature of 150° C. is desired for the heating conductors 23, 25. The of the bimetal thermostat is therefore 150° C., i.e. slightly below the critical temperature $T_c$ which makes it possible to build in a safety margin depending on the tolerances of the bimetal thermostat.

The fifth curve $L_5$ has a rise in temperature at the beginning. During this rise, the measured temperature is lower than the threshold temperature $T_s$, and the command u comprises the closure of the electric circuit. The electric current is non-zero, the heating conductors 23, 25 are powered and the heating device 21 can operate.

Then, when the temperature T of the heating conductors 23, 25 reaches the threshold first temperature $T_{s1}$, the command u comprises the opening of the electric circuit as described above. The heating device 21 can no longer operate.

As soon as the temperature T of the heating conductors 23, 25 again falls below the threshold first temperature $T_{s1}$, the electric circuit is closed again and the heating device 21 can be started again. Thus, the temperature of the heating conductors 23, 25 is stabilized at 150° C.

Thanks to the bimetal thermostat, the temperature of the heating conductors 23, 25 therefore remains below the critical temperature of use $T_c$.

In an alternative, the bimetal thermostat has a plurality of threshold temperatures. For example, the bimetal thermostat can be configured to open the electric circuit at 150° C. and close it again at 130° C.

The bimetal thermostat connected to the electrical conductors 27, 29 thus controls the current passing through them as a function of the temperature of the heating conductors by acting as a switch.

The thermal regulator 35 according to the first embodiment therefore makes it possible to increase the robustness of the heating device 21 for the temperature with respect to the heating conductors 23, 25. Furthermore, a bimetal thermostat is an inexpensive element.

The bimetal thermostat can be positioned inside the hydraulic coupling 9. Thus, the heat that it releases makes it possible to heat up the hydraulic coupling 9. This makes it possible to avoid the presence of cold zones that can disrupt the flow of the windshield washer fluid, or prevent it, for example if the hydraulic coupling 9 is frozen.

Figure 6:
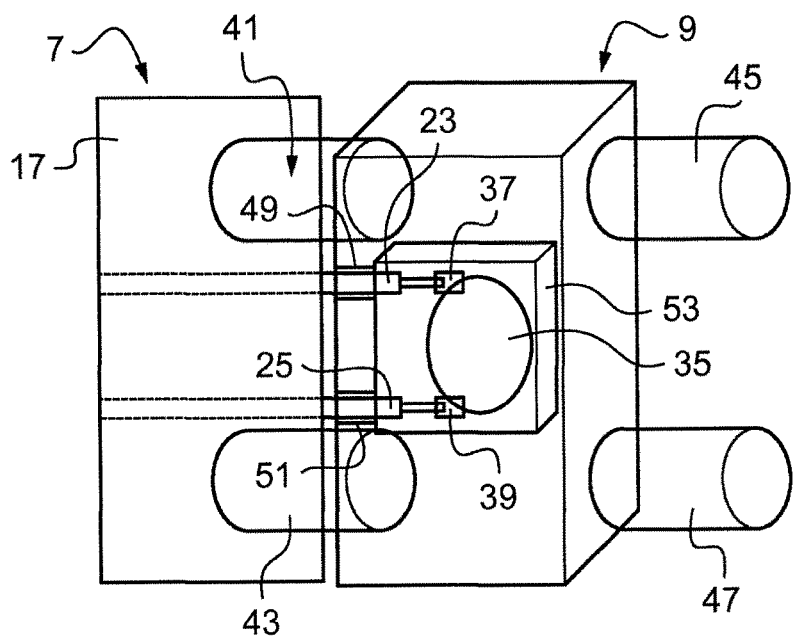
FIG. 6 is a schematic view of the current regulator fixed in a housing of a hydraulic coupling of the distribution system.

FIG. 6 shows a bimetal thermostat arranged in the hydraulic coupling 9. To facilitate the understanding of the figure, some elements are shown transparently.

The hydraulic coupling 9 has two inlet tubes 41, 43 coupled to the flow channels (not shown) of the main heat-up pipe 7, and two outlet tubes 45, 47 coupled to the flow channels of the secondary pipes 11, 13 (not shown in this figure). The hydraulic coupling 9 further has passage grooves 49, 51 making it possible to put the heating conductors 23, 25 inside the hydraulic coupling 9.

The bimetal thermostat is positioned in a housing 53 having a size of a few square centimeters for example. In addition to the bimetal thermostat, the housing 53 further accommodates the heating conductors 23, 25 and the terminals 37, 39.

Figure 7:
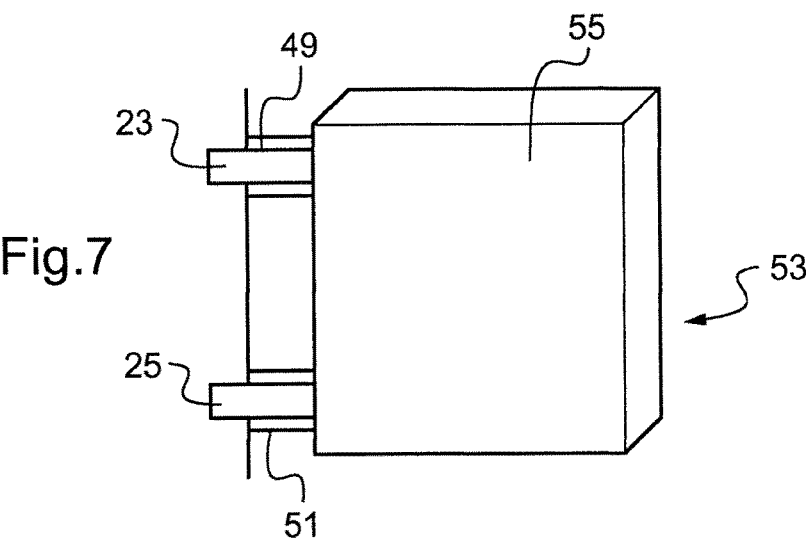
FIG. 7 is a schematic view of the housing filled with thermal adhesive encapsulating the current regulator.

A thermal adhesive 55 (FIG. 7), i.e. diffusing heat, encapsulates the bimetal thermostat. The thermal adhesive 55 improves the tensile strength of the connection of the heating conductors 23, 25 to the terminals 37, 39. It provides the mechanical cohesion of the bimetal thermostat with the heating conductors 23, 25 and with the housing 53. In addition, it makes it possible to insulate the bimetal thermostat and the heating conductors 23, 25 from the moisture of the hydraulic coupling 9, and thus protect them from electrolysis and corrosion phenomena.

Figure 8:
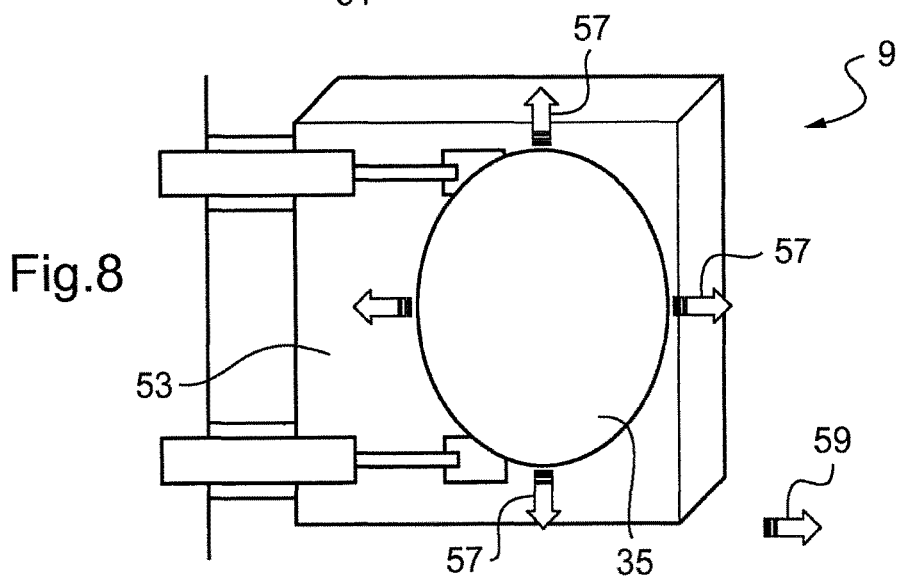
FIG. 8 is a schematic view of the heat transfers taking place in the hydraulic coupling.

The bimetal thermostat transfers the heat thereof to the housing 53, as shown by the heat transfer arrows 57 in FIG. 8. Then, in turn, the housing 53 transfers the heat thereof to the hydraulic coupling 9, as shown by the heat transfer arrows 59. The hydraulic coupling 9 is thus kept warm, thereby allowing the windshield washer fluid to easily flow in the distribution system 1.

Figure 9:
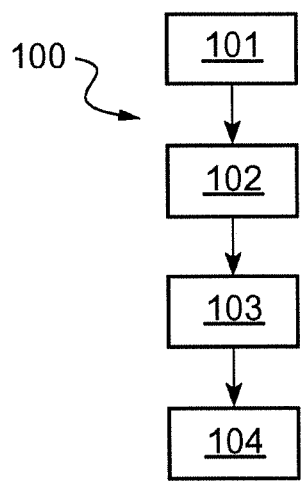
FIG. 9 is a flow diagram of the various steps of the method for assembling the current regulator.

During the method of assembling the heating device 21 according to a first embodiment 100 (FIG. 9), the series of following steps is carried out.

In a first step 101, the heating conductors 23, 25 are put into the passage grooves 49, 51 of the hydraulic coupling 9.

Then, in a second step 102, the bimetal thermostat is positioned in the housing 53 of the hydraulic coupling 9.

In a third step 103, the electrical conductors 27, 29 are welded or crimped to the terminals 37, 39 of the bimetal thermostat.

Finally, during a fourth step 104, a thermal adhesive 55 is poured into the housing 53 so as to encapsulate the bimetal thermostat.

According to an alternative, the bimetal thermostat is fixed on the main pipe 7 by means of adhesive tape (not shown).

Figure 11:
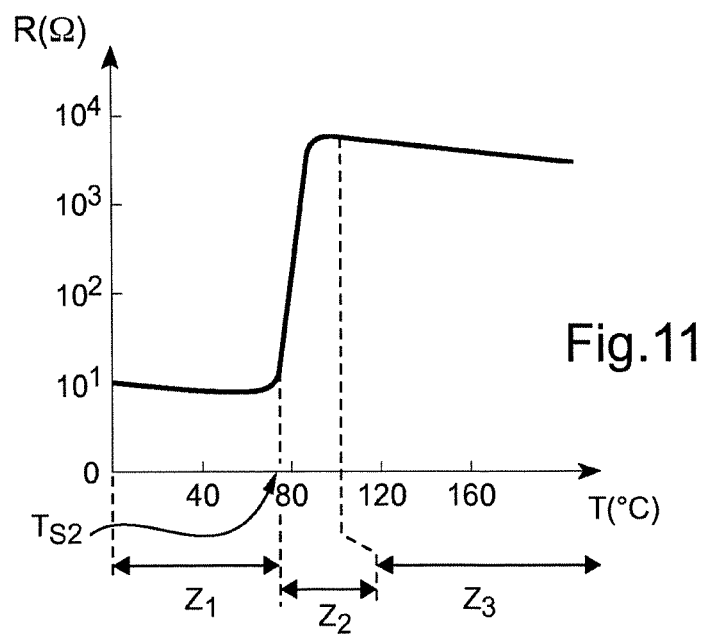
FIG. 11 is a graph depicting the variation in resistance of the positive temperature coefficient thermistor as a function of temperature.

In a second embodiment, the current regulator 35 comprises a positive temperature coefficient (PTC) thermistor, the resistance variation of which makes it possible to control the flowing current firstly by stabilizing it and secondly by interrupting it at a threshold second temperature $T_{s2}$ (FIG. 11). The PTC thermistor can thus be used as a resettable fuse.

Indeed, it has been observed, experimentally, that the resistance of the heating conductors 23, 25 varies with temperature.

Figure 10:
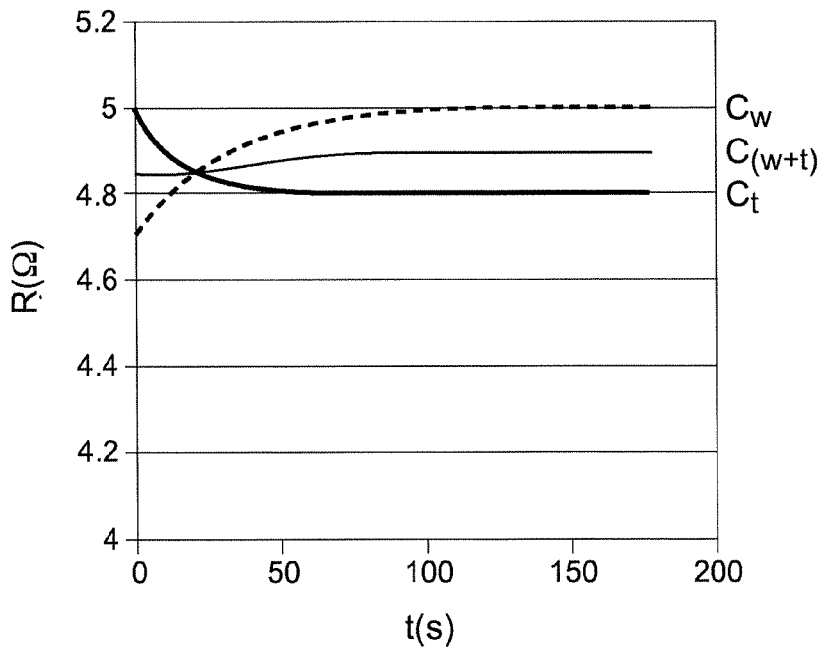
FIG. 10 is a graph depicting the variation in resistance of the heating conductors, of a positive temperature coefficient thermistor and of an assembly of these two elements.

This is illustrated by FIG. 10 which shows the variation in the resistance R (y-axis) over time t (x-axis). FIG. 10 depicts three curves: a first curve C showing the behavior of the resistance of the heating conductors 23, 25 alone, a second curve $C_t$ showing the behavior of the PTC thermistor alone, and a third curve $C_{(w+t)}$ showing the behavior of an overall resistance of the heating device where the PTC thermistor is connected to the heating conductors 23, 25.

It can be seen in this figure that the first curve C has an increasing part, then a constant part. The increasing part of the first curve C corresponds to the rise in temperature of the heating conductors 23, 25. The constant part of the resistance corresponds to the stabilized value of the temperature of the heating conductors 23, 25. In this example, the resistance of the heating conductors 23, 25 is about 4.7 at start of operation and the resistance constant value is 5.0. The variation range of the resistance of the heating conductors 23, 25 is 0.3.

It is said that the resistance of the heating conductors 23, 25 has a thermal drift. The features of this thermal drift (profile of the curve showing resistance as a function of temperature) are dependent upon the material for manufacturing the heating conductors 23, 25, the voltage and the supply current.

Since the dissipated heat is dependent upon the resistance of the heating conductors 23, 25, it is understood that the dissipated heat is not stable with respect to the temperature. The thermal sizing of the main heating pipe 7 is therefore difficult.

In addition, the variation in resistance of the heating conductors 23, 25 causes a variation in the current flowing in the electric circuit of the heating device.

Generally, the resistance of a PTC thermistor greatly increases with temperature in a limited temperature range, but decreases outside this zone. FIG. 11 shows the variation in the resistance of the PTC thermistor as a function of temperature. Three zones of resistances can be seen in this figure: a first zone $Z_1$ at low temperatures, a second zone $Z_2$ around the threshold second temperature $T_{s2}$, and a third zone $Z_3$ at high temperatures, beyond the threshold second temperature $T_{s2}$.

According to an alternative, the behavior of the PTC thermistor in the first zone $Z_1$ is used to improve the stability of the current flowing through the heating conductors 23, 25. The behavior of the PTC thermistor in the first zone Z is also shown by the second curve $C_t$ of FIG. 10. It can be seen in FIG. 10 that the resistance of the heating conductors 23, 25 and the resistance of the PTC thermistor are substantially opposite. Indeed, the resistance of the PTC thermistor decreases from 5.0 to 4.8 the resistance of the PTC thermistor is therefore close to that of the heating conductors 23, 25. The resistance of the PTC thermistor and the boundaries of the various zones $Z_1$, $Z_2$, $Z_3$ can be determined, for example, by the materials used to manufacture the PTC thermistor.

The third curve $C_{(w+t)}$ shows that assembling the PTC thermistor to the heating conductors 23, 25 makes it possible to obtain a stable resistance regardless of the duration of operation and the temperature. A slight variation can be observed at the start of the curve, corresponding to the rise in temperature of the heating conductors 23, 25. Then, the resistance stabilizes at a constant value. The resistance variation range of the PTC thermistor and heating conductor 23, 25 assembly is about 0.04, namely approximately seven times less than without the current regulator 35.

It is thus understood that the use of a current regulator 35 comprising a PTC thermistor improves the stability of the current with respect to temperature. By stabilizing the resistance of the heating device, the released heat is stabilized. Therefore, the PTC thermistor facilitates the thermal sizing of the heating device 23.

According to another alternative, the behavior of the PTC thermistor in the second zone $Z_2$ (FIG. 11) makes it possible to interrupt the flow of the current in the heating conductors 23, 25.

Indeed, the PTC thermistor has a threshold second temperature $T_{s2}$ beyond which the resistance thereof increases greatly. In the example of FIG. 11, the resistance of the PTC thermistor increases from 10.0 to approximately 10000.0 over a temperature range from 70° C. to 100° C. The PTC thermistor no longer conducts and the current flowing in the heating conductors 23, 25 then approaches a zero value. The current regulator 35 comprising a PTC thermistor therefore acts as a switch. When the current no longer flows in the heating conductors 23, 25, the latter no longer release heat and, therefore, the temperature thereof decreases. As soon as the temperature is below the threshold second temperature $T_{s2}$, the resistance of the PTC thermistor is low enough for the PTC thermistor to conduct again. The current therefore starts to flow again in the heating conductors 23, 25 which start to heat again. Advantageously, the threshold second temperature $T_{s2}$ is lower than the critical temperature $T_c$ of the heating conductors 23, 25, for example the threshold second temperature $T_{s2}$ being equal to 150° C.

According to another alternative, the behavior of the PTC thermistor in the first zone $Z_1$ and in the second zone $Z_2$ makes it possible to control the flowing current, firstly by stabilizing it and secondly by interrupting it as a function of the temperature of the heating conductors 23, 25.

The PTC thermistor can be chosen at the same time as the heating conductors 23, 25 in order to determine the overall resistance of the heating device 21.

This second embodiment makes it possible to regulate the range of the variations in temperature T that are due to the changes in resistance of the heating conductors 23, 25.

The thermistor is chosen at the same time as the heating conductors 23, 25 and the hydraulic coupling 9.

The thermal regulator 35 according to the second embodiment therefore makes it possible to increase the robustness of the heating device 21 relative to the ambient temperature of the heating conductors 23, 25 and to the power supply to the electric circuit.

As with the bimetal thermostat, the PTC thermistor can be fixed in the housing 53 of the hydraulic coupling 9, and the heat that it releases then makes it possible to heat up the hydraulic coupling 9. The PTC thermistor can be chosen at the same time as the hydraulic coupling 9 in order to ensure that there is sufficient space to house it in the hydraulic coupling 9.

The assembly method is identical to that of the bimetal thermostat.

According to an alternative, the PTC thermistor is fixed to the main heating pipe 7 by means of adhesive tape.

According to a third embodiment, the current regulator 35 comprises a bimetal thermostat and a PTC thermistor that are preferably connected in series to the heating conductors 23, 25. The current regulator 35 according to the third embodiment has the previously described switch and stabilizer capabilities.

The current regulator 35 according to the third embodiment can also be located in the hydraulic coupling 9 in order to heat it up.

The assembly method includes an additional step during which the bimetal thermostat and the PTC thermistor are connected together by electrical conductors.

It is therefore understood that a heating device 21 comprising a current regulator 35 controlling the current flowing in the heating conductors 23, 25 as a function of the temperature d makes it possible, firstly, to increase the robustness of the heating conductors 23, 25 with respect to the temperature, and secondly with respect to the supply voltage of the heating conductors 23, 25.

Indeed, a current regulator 35 comprising a bimetal thermostat acts as a switch and cuts off the power supply to the heating device 21 before the temperature T of the heating conductors 23, 25 reaches a critical value that could damage them.

A current regulator 35 comprising a PTC thermistor acts as a current stabilizer and as a current switch. The PTC thermistor makes it possible to stabilize the resistance of the circuit of the heating device 21, and thus to stabilize the amount of heat dissipated by the heating conductors 23, 25. This has the advantage of facilitating the thermal sizing of the heating device 21. In addition, the thermistor also acts as a switch and cuts off the power supply to the heating device 21 before the temperature T of the heating conductors 23, 25 reaches a critical value that could damage them.

It is also possible to associate a bimetal thermostat and a PTC thermistor in order to further improve the robustness of the heating device 21.

Finally, the current regulator 35 can be fixed in the hydraulic coupling 9 of the system for distributing windshield washer fluid, thus making it possible to heat it up thanks to the dissipated heat thereof.

The invention claimed is:

1. A heating device for a system for distributing windshield washer fluid of a motor vehicle, said heating device comprising:
    a sleeve comprising two flow channels for distributing the windshield washer fluid, the two flow channels being parallel to one another;
    at least two heating conductors embedded in a mass of the sleeve; and
    a current regulator controlling the current flowing in the heating conductors as a function of a temperature of said heating conductors,
    wherein the current regulator is coupled to a housing, and
    wherein the housing dissipates heat surrounding the current regulator into a hydraulic coupling, the hydraulic coupling comprising the housing inside.

2. The heating device as claimed in claim 1,
    wherein the current regulator is connected in series to the heating conductors at one end of the sleeve so as to close a heating electric circuit.

3. The heating device as claimed in claim 1,
    wherein the current regulator comprises a switch capable of opening the heating electric circuit when the heating conductors reach a threshold temperature.

4. The heating device as claimed in claim 1,
    wherein the current regulator comprises a bimetal thermostat.

5. The heating device as claimed in claim 4,
    further comprising a closed control loop in which the current regulator controls the temperature of the heating conductors as a function of a measured temperature of the heating conductors and of a threshold value.

6. The heating device as claimed in claim 1,
    wherein the current regulator comprises a current stabilizer, the resistance of which increases with the temperature of the heating conductors.

7. The heating device as claimed in claim 6,
    wherein the current regulator comprises a positive temperature coefficient resettable fuse.

8. The heating device as claimed in claim 1,
    wherein the current regulator is encapsulated in a thermal adhesive promoting the dissipation of the heat thereof.

9. A method for assembling a heating device as claimed in claim 1, comprising:
    placing the heating conductors into passage grooves of the hydraulic coupling;
    positioning the current regulator in the housing inside of the hydraulic coupling; and
    pouring a thermal adhesive into the housing so as to encapsulate the current regulator.

10. A system for distributing windshield washer fluid of a motor vehicle, for windshield wiper blades, the system comprising a heating device as claimed in claim 1.

11. A hydraulic coupling of a system for distributing windshield washer fluid comprising:
    passage grooves housing at least two heating conductors;
    a current regulator placed in a housing of the hydraulic coupling and controlling the current flowing in the at least two heating conductors as a function of the temperature of said at least two heating conductors,
    the at least two heating conductors and the current regulator forming, at least in part, a heating device, the heating device comprising:
        a sleeve comprising two flow channels for distributing the windshield washer fluid, the two flow channels being parallel to one another;
        the at least two heating conductors embedded in a mass of the sleeve; and
        the current regulator controlling the current flowing in the heating conductors as a function of a temperature of said heating conductors,
        wherein the current regulator is coupled to the housing, and
        wherein the housing dissipates heat surrounding the current regulator into an inside of the hydraulic coupling.

12. The hydraulic coupling as claimed in claim 11,
    wherein the current regulator is encapsulated in a thermal adhesive promoting the dissipation of the heat thereof.

* * * * *